United States Patent [19]

Bissex

[11] Patent Number: 5,364,223
[45] Date of Patent: Nov. 15, 1994

[54] MOBILE METERING STORAGE APPARATUS

[75] Inventor: Karl A. Bissex, Plainfield, Vt.

[73] Assignee: DMS, Inc., Barre, Vt.

[21] Appl. No.: 876,100

[22] Filed: Apr. 30, 1992

Related U.S. Application Data

[63] Continuation-in-part of Ser. No. 726,919, Jul. 8, 1991.

[51] Int. Cl.$^5$ .............................................. B60P 1/42
[52] U.S. Cl. ..................................... 414/526; 414/303; 414/310; 414/326; 414/503
[58] Field of Search ............... 414/212, 213, 303-313, 414/319-321, 325-326, 329, 418, 503, 523, 526

[56] References Cited

U.S. PATENT DOCUMENTS

| | | | |
|---|---|---|---|
| 2,834,451 | 5/1958 | Turner | 414/523 X |
| 2,894,733 | 7/1959 | Wosmek | 414/526 X |
| 3,212,652 | 10/1965 | Roberts | |
| 3,511,399 | 5/1970 | Sammarco | 414/526 X |
| 3,650,418 | 3/1972 | Dissmeyer et al. | 414/306 |
| 3,825,138 | 7/1974 | Pool | 414/523 X |
| 4,099,633 | 7/1978 | Lantenot | 414/309 |
| 4,146,144 | 3/1979 | Johansson | 414/313 X |
| 4,437,806 | 3/1984 | Olson | 414/307 |
| 4,717,308 | 1/1988 | Kuhns | 414/503 X |

FOREIGN PATENT DOCUMENTS

| | | | |
|---|---|---|---|
| 2463085 | 3/1981 | France | 414/309 |
| 2611681 | 9/1988 | France | |
| 0213631 | 10/1985 | Japan | |
| 0645514 | 6/1979 | U.S.S.R. | 414/319 |
| 0835332 | 6/1981 | U.S.S.R. | 414/526 |

*Primary Examiner*—Michael S. Huppert
*Assistant Examiner*—James W. Keenan
*Attorney, Agent, or Firm*—Antonelli, Terry, Stout & Kraus

[57] ABSTRACT

A mobile metering and storage apparatus which includes a mobile unit such as, for example, a tractor of a tractor-trailer unit adapted to transport, store and meter material accommodated in the mobile unit. A discharge conveyor is provided at a floor level of the mobile unit for receiving and discharging material from the mobile unit. At least one feed conveyor is disposed at a floor level of the mobile unit for feeding material to the discharge conveyor. The feed conveyor may take the form of a single tapered screw supported in a cantilever fashion along one side of the mobile unit or may be fashioned as two cantilevered tapered screw conveyors supported on a head assembly disposed substantially centrally of the mobile unit and extending in a longitudinal direction thereof. The feed conveyor may also be fashioned as a drag chain for feeding the material from one end of the mobile unit to the discharge end, with an arrangement being provided for breaking up the pile of material so as to facilitate the feeding thereof to the discharge conveyor.

27 Claims, 6 Drawing Sheets

MOBILE METERING STORAGE APPARATUS

CROSS REFERENCE TO RELATED APPLICATIONS

This application is a continuation-in-part of United States application Ser. No. 07/726,919, filed Jul. 8, 1991.

FIELD OF THE INVENTION

The present invention relates to a storage apparatus and, more particularly, to a bin for storing, delivering and metering bulk items such as, for example, wood fuel to industrial boilers, sawdust, peat, grain, silage, municipal waste, dry chemicals, shredded tires, and any other ground bulk product.

BACKGROUND OF THE INVENTION

An unloading conveyor or delivery system as disclosed in, for example, U.S. Pat. No. 3,212,652, wherein two conveyor systems are disposed in a bin, with one of the conveyor systems being disposed substantially centrally of the bin and extending in a longitudinal direction thereof, and with the second conveyor system being disposed transversely of the first conveyor system and including two opposingly pitched worm conveyors respectively disposed on opposite sides of the first conveyor system.

U.S. Pat. No. 4,717,308, proposes a container unloading system wherein an elongated auger extends over the length of a forage box just above the floor, with the auger being rotatably mounted at each end by rotatable shafts, in front and rear movable carriages which enable a transverse advancement of the auger back and forth across the floor of the box. A second conveyor is provided at a forward end of the forage box to receive materials discharged from the elongated auger. Separate and independent fluid motors provide the necessary drive for the unloading system.

Japanese Patent Publication 60-213631 proposes a storage shed arrangement wherein a longitudinally extending transport conveyor is provided and arranged below a floor surface so that granules can be smoothly fed thereto from a screw conveyor by way of reciprocally movable further conveyors which move along the floor of the shed to scrape off the granular particles from the bottom and feed the same to the transport conveyor.

French Publication 2,611,681 also proposes a conveyor arrangement for transporting materials from a flat rectangular silo wherein the transport arrangement is arranged along the floor of the surface and is reciprocally movable so as to enable a discharge of the material from the container through discharge hoppers.

A disadvantage of the above-proposed constructions reside in the fact that, with materials which are not free flowing, materials tend to bridge or hang-up over most of the conveyors, funnels or hoppers and the proposed conveyor constructions do not ensure undercutting of the pile at the floor level so as to ensure, to a maximum extent, the effect of a live floor bin.

A further disadvantage of the above proposed constructions resides in the fact that the proposed conveyor arrangements are not mobile and do not enable storage and metering of the disposed item.

SUMMARY OF THE INVENTION

The aim underlying the present invention essentially resides in providing a mobile metering storage bin which includes a conveyor arrangement which avoids, by simple means, the shortcomings and disadvantages encountered in the prior art.

In accordance with advantageous features of the present invention, a cantilevered tapered screw conveyor or sweep screw is mounted at one lateral side of a mobile unit and extends substantially over an entire length of the mobile unit, with a single standard screw or exit screw extending longitudinally of the mobile unit substantially parallel to a mounting arranged for the cantilever taper screw conveyor or sweep screw. The tapered screw or sweep screw spans substantially an entire width of the mobile unit and is adapted to draw material from walls of an interior of the mobile unit to a single standard screw or exit screw. The material is dropped into the exit screw that is mounted at a right angle to the tapered screw conveyor or sweep screw.

In order to avoid an overloading of the exit screw of single standard screw, in accordance with further features of the present invention, the exit screw is covered by a shield arrangement to shield the exit screw thereby assuring that the quantity of material delivered to the exit screw is controlled by the cantilevered tapered screw conveyor or sweep screw.

In accordance with further features of the present invention, the cantilevered conveyor or sweep screw is mounted on a beam that extends substantially over an entire length of the mobile unit over the exit screw and under the shield. The beam supports the shield and serves as a track for mounting of the sweep screw, with the sweep screw being supported only at one lateral side of the mobile unit on a head assembly and being solely driven under the material from one end of the mobile unit to the other, thereby effectively undercutting the bridges formed by continual undercutting of the pile of material.

The traveling screw assembly formed by the cantilevered taper screw conveyor or sweep screw is driven from the lateral side of the mobile unit and is supported at one end so as to make the installation operation of the system extremely simple since there is no need to align any guide rails or modify the mobile unit. Moreover, the dimensions of the apparatus, namely, the length and width, may be easily changed to suit a wide range of mobile units thereby making the apparatus of the present invention ideal for retrofitting in existing mobile units to enable delivery, storage and metering to take place.

Advantageously, the head assembly of the present invention incorporates a standard output shaft gear reducer mounted on the standard beam to create a simply traveling head, with heavy bearings being used to ride on the beam. The entire head assembly is advantageously protected by a shield, with a variable frequency drive being provided for allowing a variable speed and high starting torque.

In order to achieve a reciprocating or back-and-forth motion of the head assembly, in accordance with the present invention, a chain drive is provided wherein a pin is attached to a roller chain drive and, as the pin follows the chain around the sprocket, the pin stops and then reverses direction thereby resulting in a simply and trouble-free drive arrangement.

In order to facilitate an attachment of the sweep screw to the head assembly, in accordance with the present invention, a flange arrangement is provided between the sweep screw and a main gear box which enables the sweep screw to be bolted to the main gear box without requiring a sliding onto a shaft. Consequently, the sweep screw may, in accordance with the present invention, be installed within fractions of an inch of the outer wall of the mobile unit.

In accordance with still further features of the present invention, a spring loaded arm is mounted on an eccentric pin which, in turn, is mounted on a drive shaft of the exit screw so as to enable the realization of an oscillating action at the speed of the exit screw. The spring loaded arm functions as a lever and cooperates with a ratchet bearing that turns the chain drive sprocket in one direction only. If the sweep screw or head assembly resists any forward motion, the spring collapses and does not permit the chain to advance until the resistance of the advancing motion is removed.

Advantageously, a sweep screw has a reversed flighting for pulling material away from a wall of the mobile unit as well as away from the gear reducer, which is extremely important in order to ensure that the material fed is not contaminated with oil.

To load the materials, in accordance with the present invention, appropriate openings are provided in rear doors of the mobile unit and/or a top of the mobile unit, with the openings in the rear door enabling a pneumatic filling and the openings in the top enabling a gravity filling of material in a conventional manner.

The exit screw is, in accordance with the present invention, advantageously located on a floor of the mobile unit at a position of the reversal of the flights of the sweep conveyor.

Sensor means may be disposed in the mobile unit so as to provide a signal when the unit is empty and the material needs to be replenished.

In view of the mobility of the apparatus, the power supply for the drive of the conveyors and sensors may be provided by the ultimate user of the materials and, consequently, no power take-off or hydraulic system is necessary.

Furthermore, by virtue of the mobility of this system, there is no need to provide additional site work, foundation, permits and/or incur installation costs since, upon emptying of the mobile unit, another unit can simply be supplied to the ultimate user.

The mobile unit advantageously is constructed as conventional trailer of a tractor-trailer unit thereby facilitating the delivery and set-up at the site of the user.

With the mobile metering storage apparatus of the present invention, it is possible to supply wood, sawdust, grain, agricultural feed, recycled products and many other bulk non-free flowing materials by simply using the mobile unit that transports the material to the point of use as a storage and metering unit. Thus, since the mobile unit stores the material, there is no need to provide expensive overhead bins since the same container for transport is used for storage. Moreover, there is no transfer of material or products from container to container, and the user, for example, a wood burner, need only provide a relatively small hopper space at the site of use. The mobile unit then need only be parked over the hopper and the unit supplied with power so as to be activated as a metering bin upon demand of the burner. Consequently, there is no need to provide for a large receiving, handling and storage system, thereby resulting in a considerable reduction in the overall operating investment.

Furthermore, the technical concept of the mobile metering storage apparatus of the present invention reduces not only the costs for the ultimate user but also for the producer of the material being transported, thereby reducing the investment for both the user and the producer.

In lieu of a sweep screw, it is also possible in accordance with the present invention to provide a drag chain on the floor of the mobile unit beneath the pile of the material, with the drag chain having a width substantially corresponding to a width of the mobile unit and extending in a longitudinal direction of the mobile unit. The drag chain may terminate, at a discharge end thereof, at a position over the exit screw, with the exit screw extending transversely of the mobile unit and having a transverse width substantially corresponding to a width of the mobile unit.

It is also possible in accordance with the present invention to provide a plurality of agitators which are displaceable in a longitudinal direction of the mobile unit to break down the pile of material and feed the same to the exit screw.

The above and other objects, features and advantages of the present invention will become more apparent from the following description when taken in connection with the accompanying drawings which show, for the purpose of illustration only, one embodiment in accordance with the present invention.

DETAILED DESCRIPTION

Figure 1:
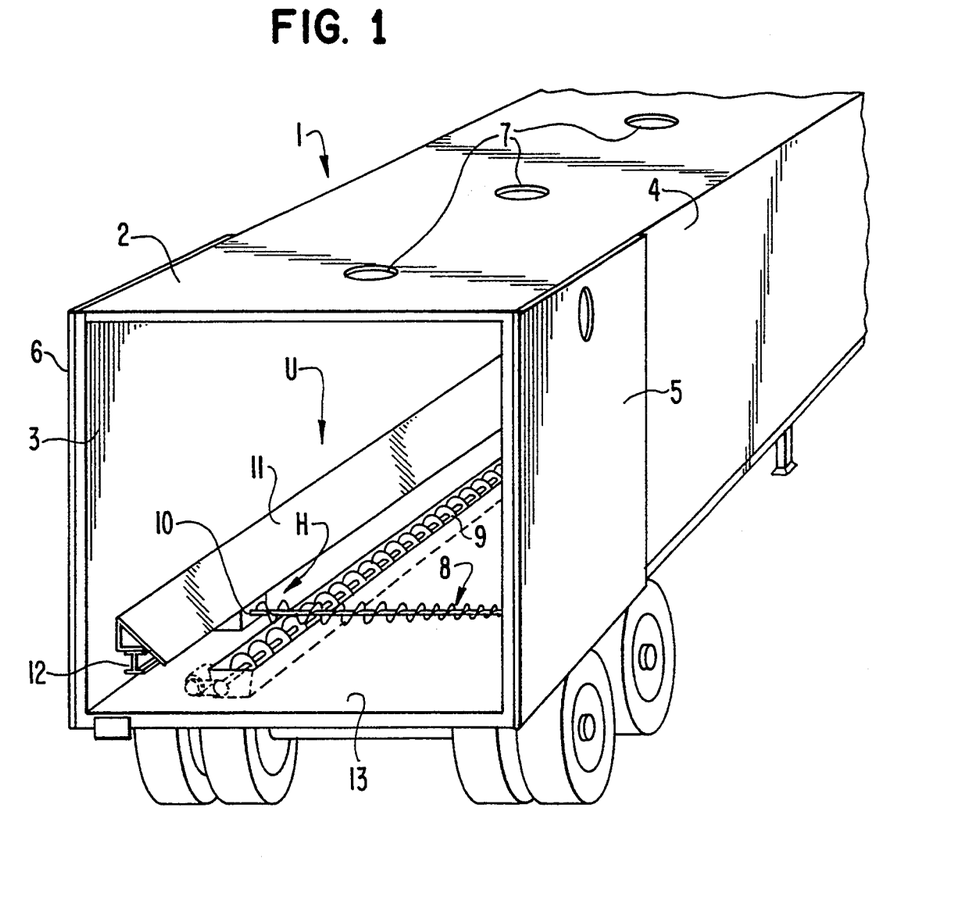
FIG. 1 is a perspective schematic view of a mobile metering storage apparatus constructed in accordance with the present invention.
Figure 2:
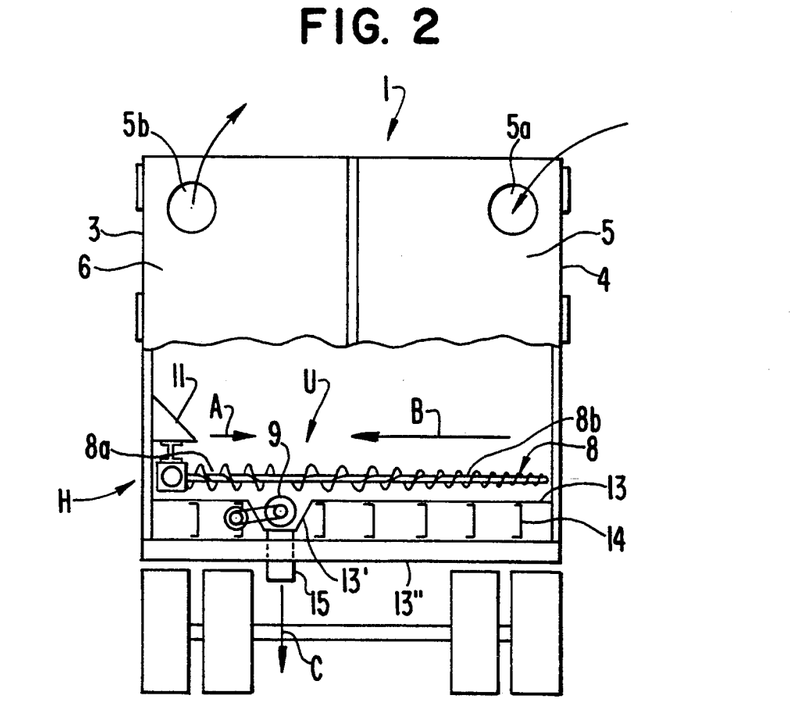
FIG. 2 is a partially broken away end view of the apparatus of FIG. 1.

Referring now to the drawings wherein like reference numerals are used throughout the various views to designate like parts and, more particularly, to FIGS. 1 and 2, according to these figures, a mobile metering and storage apparatus according to the present invention includes a mobile unit generally designated by the reference numeral 1, with the mobile unit including a top or roof 2, side walls 3, 4, doors 5, 6, and a floor portion 13.

An unloading unit generally designated by the reference character U is arranged in the mobile unit 1. The unloading unit U includes a standard I-shaped beam 12 mounted on the floor 13 and disposed along one side wall, for example, the side wall 3 in the illustrated embodiment, with the I-shaped beam 12 extending in a longitudinal direction of the mobile unit 1. A head assembly generally designated by the reference character H is reciprocably displaceably mounted on the I beam 12. A tapered screw conveyor or sweep screw generally designated by the reference numeral 8 is mounted on the head assembly H in a cantilever fashion, with the screw conveyor or sweep screw 8 extending from the head assembly over the width of the mobile unit 1. The tapered screw conveyor or sweep screw 8 has opposed threaded sections 8a, 8b for enabling a delivery of the material in the mobile unit 1 in the direction of the arrows A and B toward a standard screw conveyor or exit screw 9. As shown in FIGS. 1 and 2, the exit screw or conveyor 9 extends in a longitudinal direction of the mobile unit 1 and is spaced from the side wall 3. The screw conveyor or exit screw 9 is disposed in a trough 13' formed in the floor 13 of the mobile unit 1, with the floor 13 being supported on an undercarriage 13" of the mobile unit 1 by longitudinally extending support members 14. A shield 11 is mounted above the head assembly H for preventing any free flowing material from jamming the head assembly and also for directing the material in the area of the side wall 3 toward the tapered screw conveyor or sweep screw 8.

Figure 3:
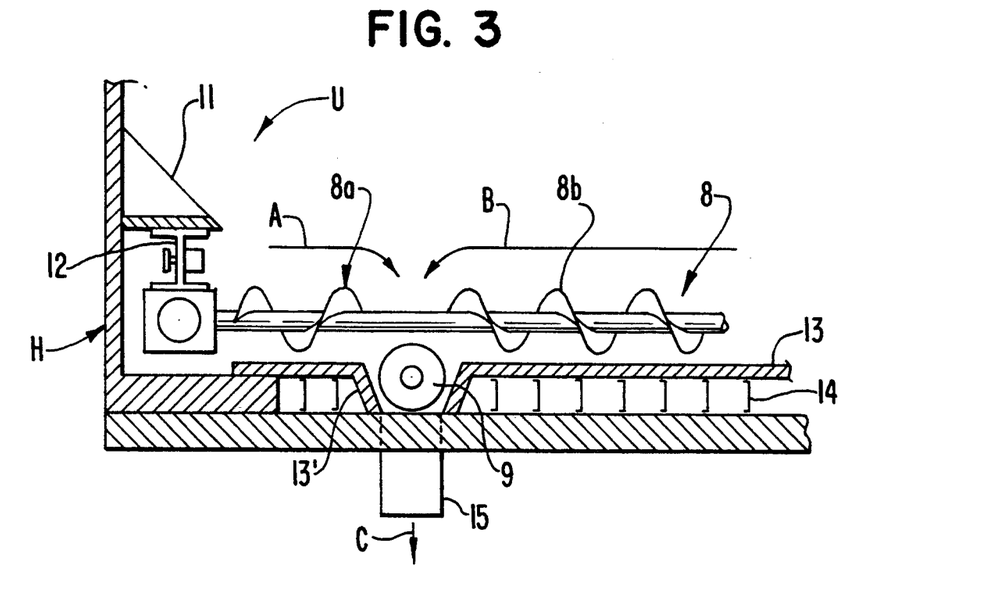
FIG. 3 is a schematic cross-sectional view of a feed and discharge conveyor of the apparatus of FIG. 1.

In operation, the tapered screw conveyor or sweep screw 8 draws material from the walls 3, 4 of the mobile unit 1 in the direction of the arrows A, B, with the drawn material being dropped into the screw conveyor or exit screw 9 which is mounted at a right angle to the tapered screw conveyor or sweep screw. The material in the screw conveyor or exit screw 9 is then transported or metered out of the interior of the mobile unit 1 and is discharged through a discharge opening or hopper 15 in the direction of the arrow C as shown most clearly in FIG. 3.

Figure 4:
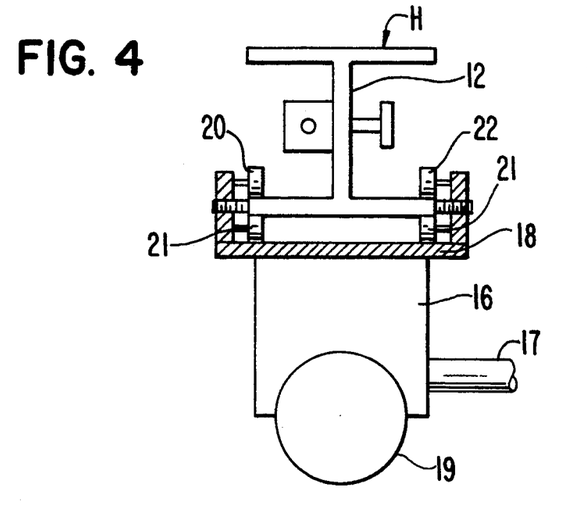
FIG. 4 is a schematic partial cross-sectional view of a head assembly of the apparatus of FIG. 1.
Figure 5:
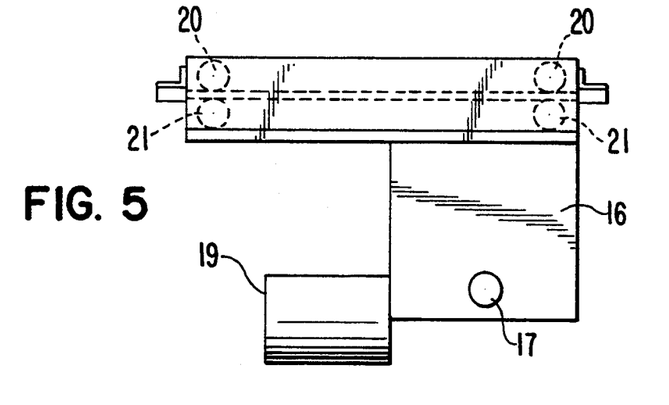
FIG. 5 is a schematic side view of the head assembly of FIG. 4.

As shown in FIGS. 4 and 5, the head assembly 1 includes a conventional gear reducer 16 connected to an output shaft 17 of the tapered screw conveyor or sweep screw 8. The gear reducer 16 is supported on the beam 12 by a mounting bracket through a plurality of conventional cam follower bearing means supported on the beam 12 by a mounting bracket 18 through a plurality of conventional cam follower bearing means 20, 21 supported on the mounting bracket 18.

Figure 6:
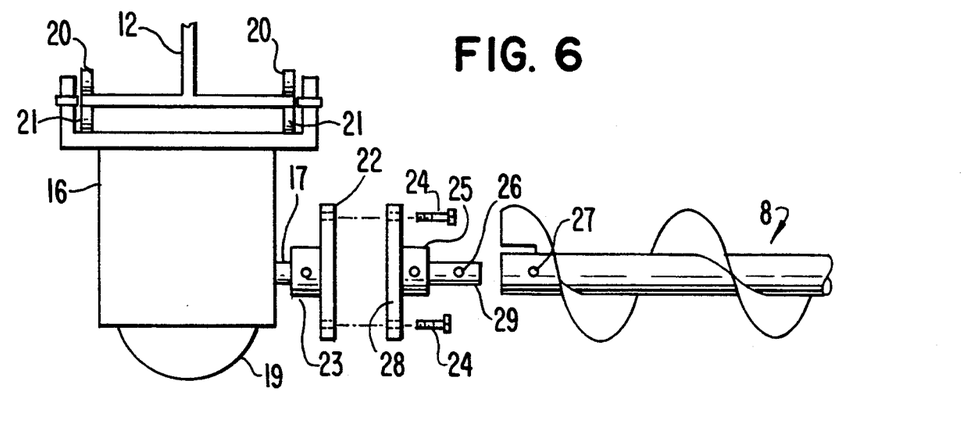
FIG. 6 is an exploded view of a connection between the head assembly and unloading means of the apparatus of the present invention.

As shown most clearly in FIG. 6, the tapered screw conveyor or sweep screw 9 is connected to the gear reducer 16 by a flanged connection including a flange 22 mounted by way of a hub 23 to the output shaft 17 and a further flange 28 connected to the screw conveyor or exit screw 8. The hub 23 may be connected to the shaft 17 by a pin (not shown) inserted into aligned holes in the hub 23 and shaft 17 or by any other suitable conventional coupling arrangement which ensure a direct non-slip coupling between the shaft 17 and the hub 23 of the flange 22. The flange 28 is provided with a hub portion 25 having an extension 29 adapted to be received in the screw conveyor or sweep screw 8, with the screw conveyor or sweep screw 8 being non-rotatably secured to the extension 29 by a pin (not shown) inserted into aligned hole 26, 27 respectively provided in the extension 29 and the screw conveyor or sweep screw 8. By virtue of the flanged connection of the screw conveyor or sweep screw 8 to the gear reducer 16, it is possible to realize a simply disassembly of the screw conveyor 8 from the head assembly H even with the screw conveyor or sweep screw 8 is buried in the material accommodated in the mobile unit 1.

A motor 19 provides input power to the gear reducer 16, with the output shaft 17, through suitable gear reduction, driving the screw conveyor or sweep screw 8.

Figure 7:
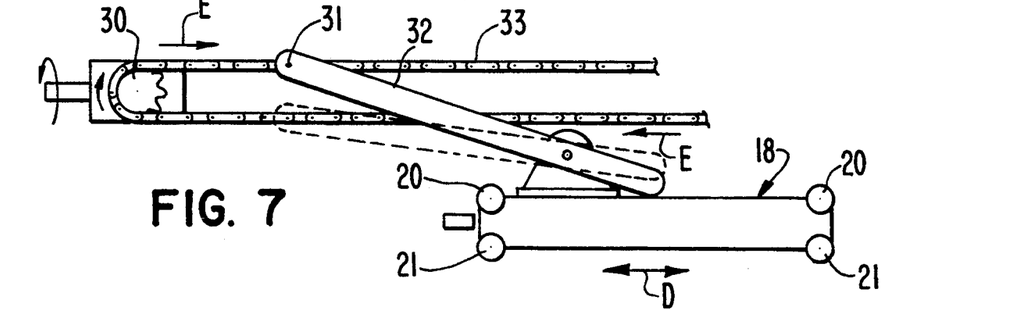
FIG. 7 is a schematic view of a drive arrangement for reciprocatingly moving the unloading means of the apparatus of FIG. 1.

The head assembly H is mounted on a beam 12 for reciprocating movement in a direction of the double-headed arrow D (FIGS. 7 and 8) and, for this purpose, as shown most clearly in these figures, a chain drive system is provided which includes a pair of spaced rotatable chain sprockets 30 mounted on the beam 12, with roller chains 33 being disposed between the two chain sprockets 30. The motor 19 for driving the screw conveyor or sweep screw 8 is mounted on the head assembly H and provides a variable frequency drive for the screw conveyor or sweep screw 8 thereby enabling not only a variable speed but also a high starting torque.

In order to achieve the reciprocating motion of the head assembly H and therewith the screw conveyor or sweep screw 8 in the direction of the double-head arrow D, a pin 31 is attached to the roller chain 33 and is adapted to follow the roller chain 33 around the respective sprockets 30. The pin 31 is pivotally connected by a link 32 to the mounting bracket 18 for the head assembly H. As apparent from FIG. 7, as the roller chain 33 moves in the direction of the arrows E, the head assembly H will be displaced toward the right of the figure and, after the pin 31 passes the sprocket 30 at the far end of the mobile unit 1, the pin 31 is disposed on a return run of the roller chain 33 as shown in phantom line in FIG. 7, thereby resulting in the head assembly H being displaced toward the opposite side of the mobile unit 1 until arriving at the home position shown in FIG. 8. The pin 31 then passes around the sprocket 30 at the left of FIG. 7 and is displaced to the far end of the mobile unit, that is, the rear of the mobile unit 1. The sprocket 19 near the far end of the mobile unit 1 and the link 32 are positioned and dimensioned so as to enable the screw conveyor or sweep screw 8 to traverse the entire length of the mobile unit 1 from the front end of the mobile unit to the discharge end thereof.

Figure 8:
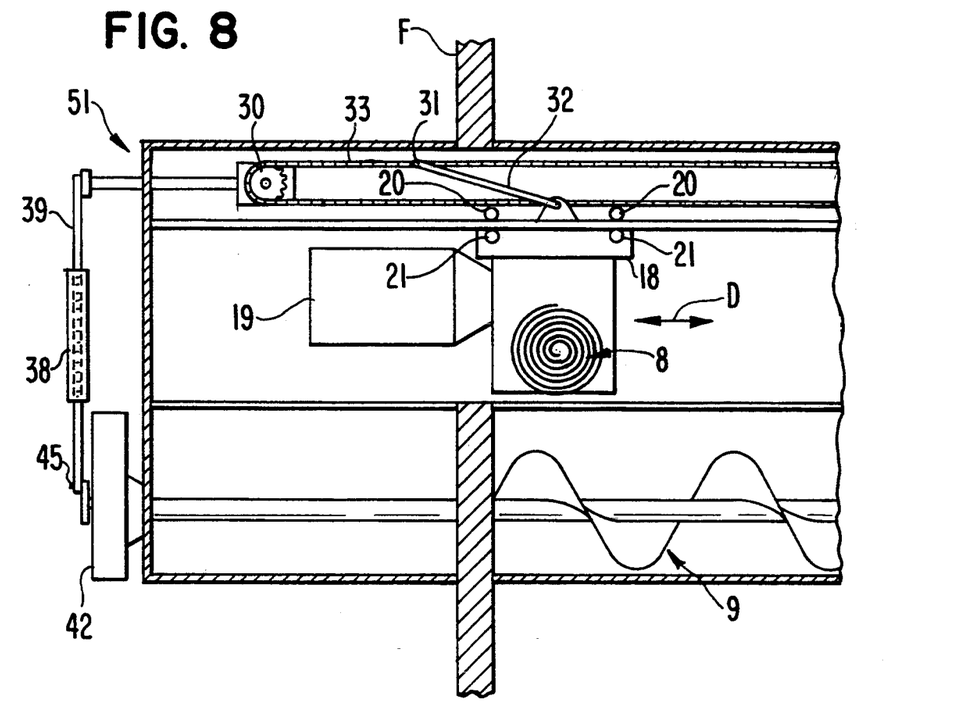
FIG. 8 is a schematic view of an unloading means of FIG. 7 in a home position.

To facilitate servicing of the head assembly H, as shown in FIG. 8, the unloader extends beyond a front wall F of the mobile unit 1 so that when the head assembly H is in the home position of FIG. 8, access to the head assembly and/or the screw conveyor or sweep screw 8 is possible by removal of a cover generally designated by the reference numeral 51. Such access permits an operator to inspect and/or service the head assembly H each time the head assembly returns to the home position, which home position is located at the front end of the mobile unit 1. However, as readily apparent, the home position may also be provided at a discharge end of the mobile unit 1 in a manner described more fully in United States application Ser. No. 07/726,919, which is incorporated herein by reference.

Figure 9:
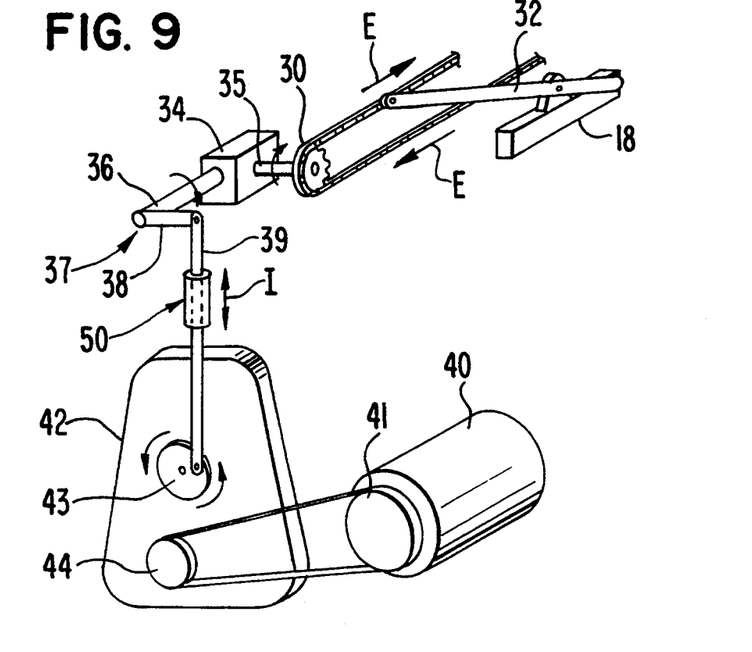
FIG. 9 is a perspective schematic view of a movement control arrangement for a portion of the unloading means of the apparatus of FIG. 1.
Figure 10:
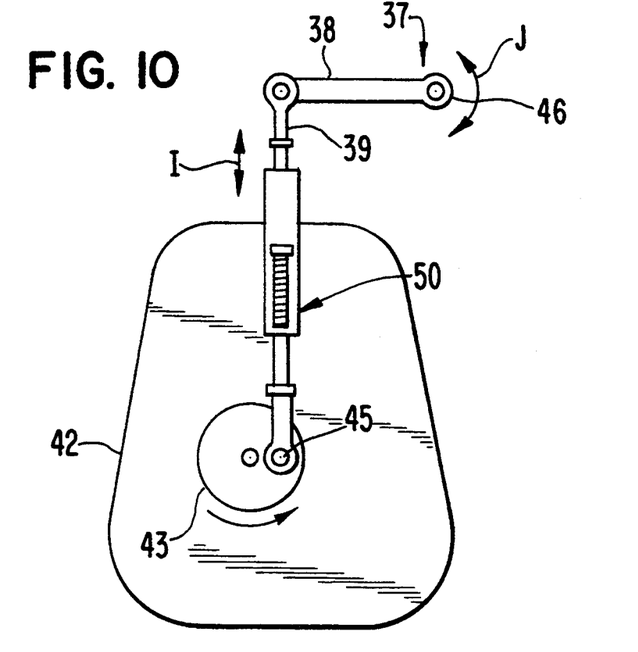
FIG. 10 is a plan view of the movement control arrangement of FIG. 9.

As shown in FIG. 9 and 10, to drive the roller chain 33, one of the sprockets 30 is connected to a conventional right angle gear box 34 having a 1:1 gear ratio, with the gear box 34 having an input shaft 36 and an output shaft 35 connected to the sprocket 30. The input shaft 36 is connected to a drive linkage generally designated by the reference numeral 37 including a conventional pawl and ratchet one-way clutch 46, a link member 38, and a further link member 39, with the pawl and ratchet one-way clutch 46 being interposed between the link member 38 and the input shaft 36 of the gear box 34. One end of the link member 39 is connected to an end of the link member 38 opposite the clutch 46, with an opposite end of the link member 39 being connected to an eccentric 45 mounted on a drive shaft 43 of the exit screw 9. The drive shaft 43 of the exit screw 9 is driven through suitable gearing in a gear box 42 by a drive motor 40, drive belt 41 and input pulley 44 for the gear box 42. By virtue of the one-way clutch drive arrangement, it is possible to achieve an oscillating action in the direction of the arrows I and J at the speed of the exit screw 9. The link mechanism 37 works as a lever and ratchet to drive the sprocket 30 only in one direction.

In order to minimize damage to the head assembly H and/or the screw conveyor or sweep screw 8, as shown in FIGS. 9 and 10, the link member 39 includes a spring assembly generally designated by the reference numeral 50 interposed between the eccentric pin 45 and the link member 34. The spring assembly 50 has a spring characteristic such that the chain roller 33 is driven through the link mechanism 37, gear box 34 and sprocket 30 under normal operating conditions determined by the material being unloaded. However, if the head assembly H and/or the screw conveyor or sweep screw 8 encounters an obstacle in the material or if, for some other reason, the drive experiences a resistance in excess of the spring force of the spring assembly 50, the spring assembly 50 collapses and the drive of the head assembly H is interrupted until such time as the obstacle or resistance is removed. The spring force of the spring assembly 50 is naturally determined by the nature of the material being handled.

By virtue of the disposition of the screw conveyor or sweep screw 8 and cantilevered arrangement of the same in the manner described hereinabove, it is possible to undercut the pile at the floor level as much as possible thereby effectively producing the effect of a live floor bin.

Moreover, by virtue of the support of the screw conveyor or sweep screw 8 only on the head assembly and slowly driving the same under the material from one end of the mobile unit 1 to another effectively undercuts the bridges that are forming by continually undercutting the pile.

By driving the head assembly H and screw conveyor or sweep screw 8 from only one side of the mobile unit 1, installation and operation of this system is very simple. Moreover, there is no need to align the rails or modify the mobile unit and the dimensions of the entire assembly, for example, length and width are easily changed to suit the dimensions of the mobile unit 1. Thus, an apparatus such as contemplated by the present invention is ideally suited for retrofitting existing mobile units where transportation, storage and metering is to take place.

Furthermore, the unloading apparatus of the present invention is readily available not only for the handling of sawdust but also for peat, grains, silage, and municipal waste, dry chemicals, shredded tires and any other ground bulk products, with the only criteria being the particle size and the interior size of the mobile unit for achieving optimum results.

To facilitate loading, as shown in FIG. 1, one or more openings may be provided in the top or roof 2 of the mobile unit 1. In addition to the opening 7 or as an alternative thereto, it is also possible to provide openings 5a, 5b in the doors 5, 6 of the mobile unit 1 as shown in FIG. 2, with the material being supplied by suitable means (not shown) into the opening 5a and air from the interior of the mobile unit being discharged through the opening 5b and/or openings 7. The provision of the openings 7 and/or 5a, 5b would naturally be governed by the user's demand and, for example, the mobile unit 1 may be an open top or uncovered unit.

Figure 11:
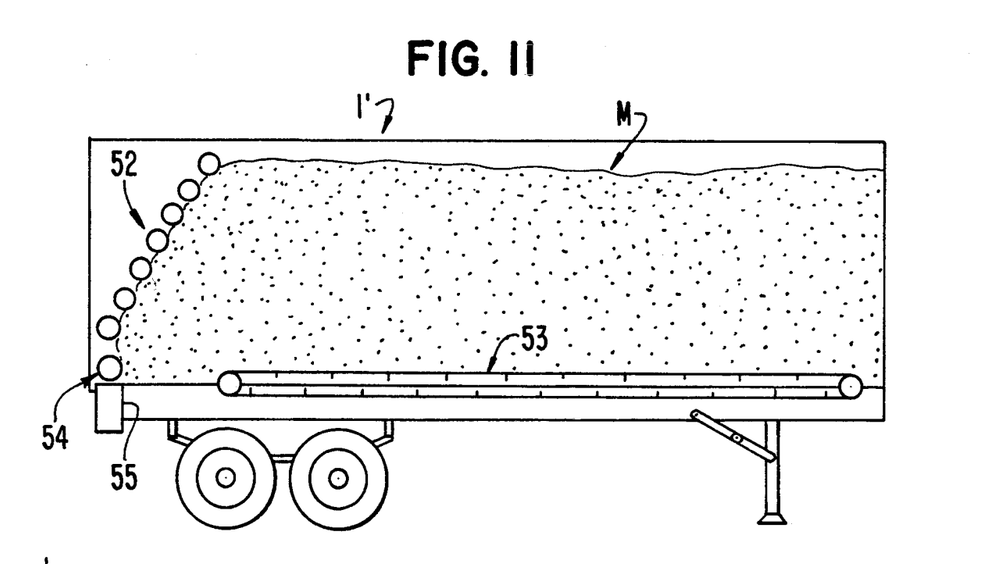
FIG. 11 is a schematic view of another embodiment of a mobile metering and storage apparatus constructed in accordance with the present invention.

Alternatively, as shown in FIG. 11, it is also possible in accordance with the present invention to provide a mobile unit generally designated by the reference numeral 1' having at least one drag chain generally designated by the reference numeral 53 disposed on a floor of the mobile unit 1' and extending in a longitudinal direction thereof. The at least one drag chain has a transverse width substantially corresponding to the width of the mobile unit 1'. A bank of rotatably driven screws or agitators generally designated by the reference numeral 52 are provided at the discharge end of the mobile unit 1'. The drag chain 53 delivers the material M to the bank of screws or agitators 52, with the bank of screws or agitators breaking down the pile of material and feeding the same to an exit screw conveyor 54 which, in turn, delivers the material to a discharge chute or opening 55 thereby enabling a metered dispensing of the material.

Figure 12:
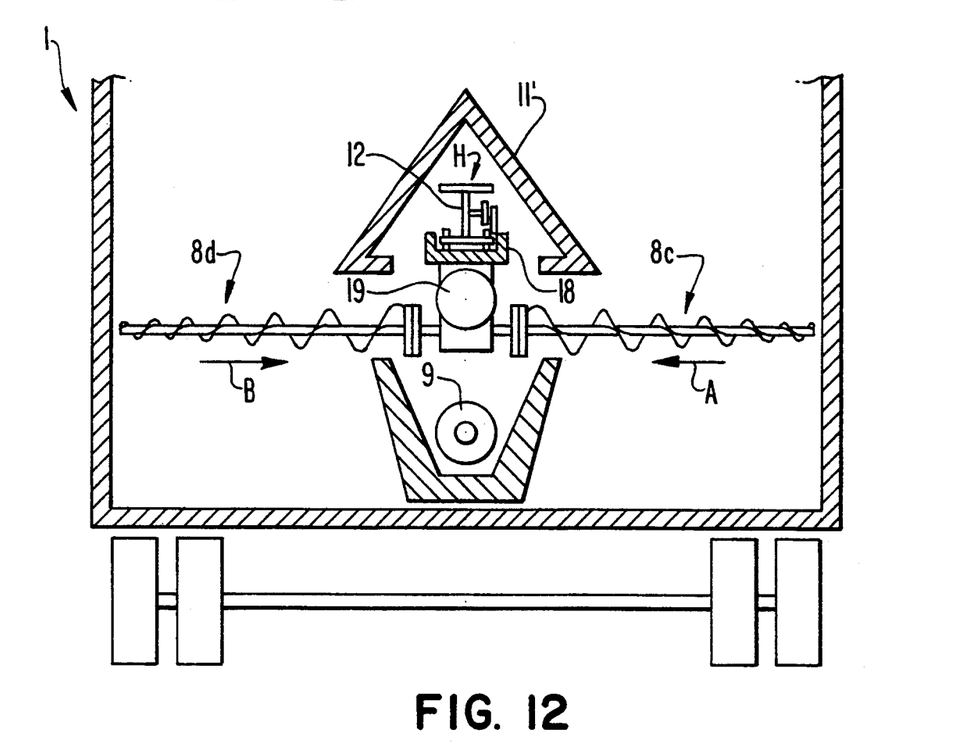
FIG. 12 is a schematic view on an enlarged scale, of yet another embodiment in accordance with the present invention.

It is also possible in accordance with the present invention to dispose the exit conveyor 9 substantially centrally of the width of the mobile unit 1, with the exit conveyor 9 extending along the entire length of the mobile unit and 9 disposed centrally of the mobile unit 1. Two tapered screw conveyors or sweep screws 8c, 8b as well as the mounting thereof may be accomplished in the same manner described in United States application Ser. No. 07/726,919, the disclosure of which is incorporated herein by reference.

While I have shown and described several embodiments in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. A mobile metering and storage apparatus comprising:
   a mobile unit for transporting, storing and metering material accommodated therein, said mobile unit including at least a pair of spaced side walls and a floor interconnecting said spaced side walls;
   a discharge conveyor provided at a floor level of the mobile unit for receiving and discharging material from the mobile unit;
   a feed conveyor for feeding the material to the discharge conveyor including a head assembly, at least one screw conveyor for feeding material from respective sides of the mobile unit toward the discharge conveyor, and a drive mounted on said head assembly for driving said at least one screw conveyor; and
   means extending along only one of said side walls in a longitudinal direction of the mobile unit for solely supporting said feed conveyor in said mobile unit.

2. A mobile metering and storage apparatus according to claim 1, wherein means, connected to said head assembly, are provided for reciprocatingly moving said feed conveyor along a length of said mobile unit.

3. A mobile metering and storage apparatus according to claim 2, wherein means are provided for interrupting a movement of said head assembly upon at least one of said head assembly and said at least one screw conveyor encountering a predetermined resistance.

4. A mobile metering and storage apparatus according to claim 3, wherein said means for reciprocatingly moving comprises a drive chain including a drive pin, a link connected to said drive pin and said head assembly, and means for driving said drive chain.

5. A mobile metering and storage apparatus according to claim 4, wherein said means for driving said drive chain includes a drive sprocket, and means connected to said drive sprocket for driving the drive sprocket only in one direction.

6. A mobile metering and storage apparatus according to claim 5, wherein said means for driving the drive sprocket includes a drive linkage connected to an output shaft of said discharge conveyor, and a one way clutch for driving said drive sprocket in said one direction.

7. A mobile metering and storage apparatus comprising:
- a mobile unit for transporting, storing and metering material accommodated therein, said mobile unit including at least a pair of spaced side walls and a floor interconnecting said spaced side walls;
- a discharge conveyor provided at a floor level of the mobile unit for receiving and discharging material from the mobile unit;
- a feed conveyor for feeding the material to the discharge conveyor including a head assembly, at least one screw conveyor for feeding material from respective sides of the mobile unit toward the discharge conveyor, and a drive mounted on said head assembly for driving said at least one screw conveyor; and
- means extending in a longitudinal direction of the mobile unit for supporting said feed conveyor in said mobile unit including a beam disposed along one of said side walls, and
wherein said at least one screw conveyor includes a tapered screw mounted in a cantilevered fashion on said head assembly.

8. A mobile metering and storage apparatus according to claim 7, wherein said head assembly includes a reduction gear interposed between an output of said drive and said at least one screw conveyor.

9. A mobile metering and storage apparatus according to claim 8, wherein means are provided between said head assembly and said discharge conveyor for preventing an overloading of said discharge conveyor.

10. A mobile metering and storage apparatus according to claim 9, wherein means are provided for shielding said head assembly from material accumulated in the mobile unit and for ensuring a uniform distribution of the material from the screw conveyor to the discharge conveyor.

11. A mobile metering and storage apparatus according to claim 7, wherein means, connected to said head assembly, are provided for reciprocatingly moving said feed conveyor along a length of said mobile unit.

12. A mobile metering and storage apparatus according to claim 11, wherein means are provided for interrupting a movement of said head assembly upon at least one of said head assembly and said at least one screw conveyor encountering a predetermined resistance.

13. A mobile metering and storage apparatus according to claim 12, wherein said means for reciprocatingly moving comprises a drive chain including a drive pin, a link connected to said drive pin and said head assembly, and means for driving said drive chain.

14. A mobile metering and storage apparatus according to claim 13, wherein said means for driving said drive chain includes a drive sprocket, and means connected to said drive sprocket for driving the drive sprocket only in one direction.

15. A mobile metering and storage apparatus according to claim 14 further comprising a gear box including an output shaft connected to said drive sprocket and an input shaft connected to said means for driving the drive sprocket only in one direction.

16. A mobile metering and storage apparatus according to claim 15, wherein said means for interrupting includes a spring assembly having a predetermined spring force so as to enable a driving of said drive chain during a normal operation and to interrupt the drive upon at least one of the head assembly and the fed conveyor encountering a resistance greater than said spring force.

17. A mobile metering and storage apparatus according to claim 16, wherein said at least one screw conveyor includes a tapered screw mounted in a cantilevered fashion on said head assembly, and wherein said head assembly includes a reduction gear interposed between an output of said drive for driving said at least one screw conveyor.

18. A mobile metering and storage apparatus according to claim 17, wherein means are provided between said head assembly and said discharge conveyor for preventing an overloading of said discharge conveyor.

19. A mobile metering and storage apparatus according to claim 7, wherein means are provided between said head assembly and said discharge conveyor for preventing an overloading of said discharge conveyor.

20. A mobile metering and storage apparatus according to claim 19, wherein means are provided for shielding said head assembly from material accumulated in the mobile unit and for ensuring a uniform distribution of the material from the screw conveyor to the discharge conveyor.

21. A mobile metering and storage apparatus according to claim 7, wherein means are provided for shielding said head assembly from material accumulated in the mobile unit and for ensuring a uniform distribution of material from said at least one screw conveyor to said discharge conveyor.

22. A mobile metering and storage apparatus comprising:
- a mobile unit for transporting, storing and metering material accommodated therein, said mobile unit including at least a pair of spaced walls and a floor interconnecting said spaced walls;
- a discharge conveyor provided at a floor level of the mobile unit for receiving and discharging material from the mobile unit;
- a feed conveyor for feeding the material to the discharge conveyor including a head assembly, at least one screw conveyor for feeding material from respective sides of the mobile unit toward the discharge conveyor, and a drive mounted on said head assembly for driving said at least one screw conveyor;

means extending in a longitudinal direction of the mobile unit for supporting said feed conveyor in said mobile unit;

means connected so said head assembly for reciprocatingly moving said feed conveyor along a length of said mobile unit;

means for interrupting a movement of said head assembly upon at least one of said head assembly and said at least one screw conveyor encountering a predetermined resistance:

wherein said means for reciprocatingly moving comprises a drive chain including a drive pin, a link connected to said drive pin and said head assembly, and means for driving said drive chain, said means for driving said drive chain includes a drive sprocket, and means connected to said drive sprocket for driving the drive sprocket only in one direction, and wherein said means for driving the drive sprocket includes a drive linkage connected to an output shaft of said discharge conveyor, and a one way clutch for driving said drive sprocket in said one direction.

23. A mobile metering and storage apparatus according to claim 22, wherein a gear box is interposed between said drive sprocket and said drive linkage, said gear box including an output shaft connected to said drive sprocket and an input shaft connected to said one-way clutch.

24. A mobile metering and storage apparatus according to claim 23, wherein said means for interrupting includes a spring assembly provided in said drive linkage between said output shaft and said one-way clutch, said spring assembly having a predetermined spring force so as to enable said drive linkage to drive said drive chain during a normal operation and to interrupt the drive upon at least one of the head assembly and the feed conveyor encountering a resistance greater than said spring force.

25. A mobile metering and storage apparatus according to claim 24, wherein said at least one screw conveyor includes a tapered screw mounted in a cantilevered fashion on said head assembly, and wherein said head assembly includes a reduction gear interposed between an output of said drive for driving said at least one screw conveyor.

26. A mobile metering and storage apparatus according to claim 25, wherein means are provided between said head assembly and said discharge conveyor for preventing an overloading of said discharge conveyor.

27. A mobile metering and storage apparatus according to claim 26, wherein means are provided for shielding said head assembly from material accumulated in the mobile unit and for ensuring a uniform distribution of material from said at least one screw conveyor to said discharge conveyor.

* * * * *